(No Model.)
W. S. SAVIERS.
BEAN PLANTER.
No. 583,605. Patented June 1, 1897.
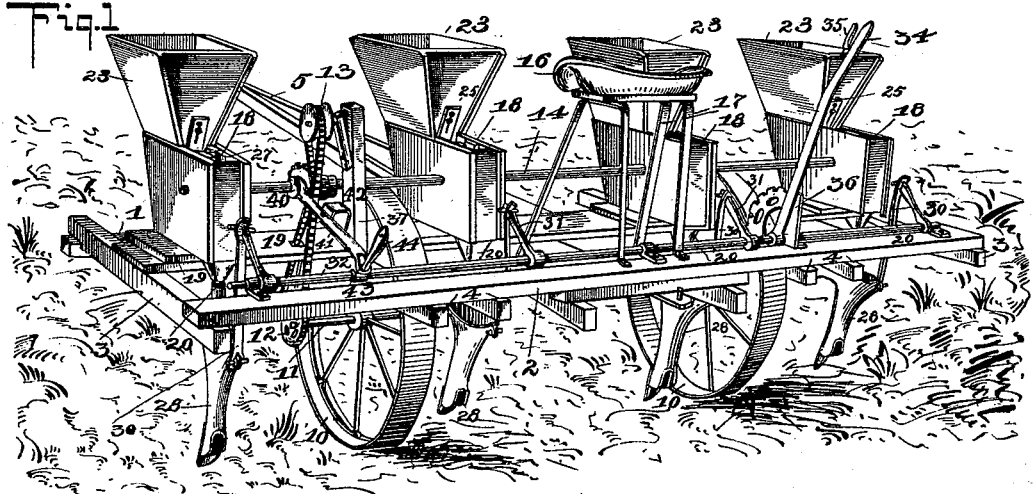
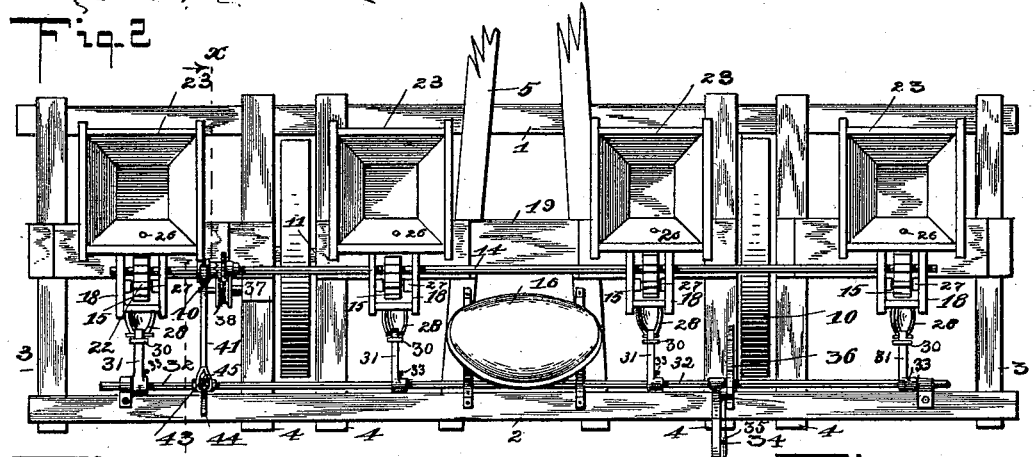
Witnesses
Edmund A. Strause
V. B. Hillyard
Inventor
Winfield S. Saviers
By his Attorneys,
C A Snow & Co.

UNITED STATES PATENT OFFICE.

WINFIELD S. SAVIERS, OF HUENEME, CALIFORNIA.

BEAN-PLANTER.

SPECIFICATION forming part of Letters Patent No. 583,605, dated June 1, 1897.

Application filed June 13, 1896. Serial No. 595,437. (No model.)

*To all whom it may concern:*

Be it known that I, WINFIELD S. SAVIERS, a citizen of the United States, residing at Hueneme, in the county of Ventura and State of California, have invented a new and useful Bean-Planter, of which the following is a specification.

This invention relates to planters, and more particularly to such as are designed for dropping beans or like grain which are required to be planted in drills and at regular intervals apart; and the purpose of the improvement is to devise a mechanism which will be simple in construction and the arrangement of its parts and which will drop one or two beans at a time without breaking or otherwise injuring them, so as to prevent their germinating after being planted.

The improvement is directed more especially to the general construction of the planter, as will appear more fully hereinafter, reference being had to the several views of the accompanying drawings, in which corresponding and like parts are designated by the same reference-characters.

Figure 1 is a perspective view from the rear of a planter constructed in accordance with the principles of this invention. Fig. 2 is a top plan view thereof. Fig. 3 is a longitudinal section about on the line X X of Fig. 2. Fig. 4 is a similar section of the hopper, on a larger scale, showing the operation of the seed-dropping wheel.

The frame of the machine is composed of front and rear bars 1 and 2, end bars 3, and intermediate bars 4, extending about parallel with the end bars 3 and firmly secured at their ends to the front and rear bars. The front bar 1 is bolted to the lower side of the bars 3 and 4, and the rear bar 2 is similarly secured to the top side of the longitudinal bars, thereby throwing the bars 1 and 2 in different relative planes with respect to the plane of the longitudinal bars 3 and 4. The pole or tongue 5 is composed of similar members, which are spread at their rear ends and are secured in any substantial manner to the bars 1 and 2, and which converge at their front ends where they are secured together. The ground-wheels 10 are secured to a shaft 11, journaled in bearings applied to the intermediate longitudinal bars 4, and a sprocket-wheel 12 is secured to the axle 11 and receives a sprocket-chain 13, by means of which motion is imparted to the shaft 14, to which are attached the seed-dropping wheels 15. The seat 16 is secured to the upper ends of standards 17, which are fastened at their lower ends to the rear bar 2 and the rear end portions of the members comprising the pole or tongue 5.

A series of narrow and oblong boxes 18 are supported upon boards 19, secured to the longitudinal bars of the frame, and are open at their upper ends and closed at their lower ends, and have discharge-spouts 20 at their rear ends for the escape of the beans or seed. Each box 18 and its adjunctive parts are similarly formed. Hence a detailed description of the one will be sufficient to a clear understanding of this feature of the improved planter.

A block 21 is located in advance of the discharge-spout 20 in the box 18, and its top side is curved on the arc of a circle corresponding to the path traveled by the outer ends of the cups 22, provided at intervals in the circumferential length of the grain-wheel 15. A hopper 23 is located at the front end of the box and receives the seed in bulk. The walls of the hopper converge, and its rear side extends into the box 18, as shown at 24, so as to prevent the seed from crowding upon the grain or seed dropping wheel 15. A slide 25 has adjustable connection with the lower end of the part 24 and is adapted to be projected to a greater or less extent below the lower edge of the part 24, according to the nature of the seed to be planted, so as to prevent the latter from crowding upon the grain-wheel 15, so that the latter may take up one or more seeds, according to the quantity to be planted in a hill. The slide 25 is slotted, and a binding-screw 26 operates through the slot and is adapted to secure the slide in the located position. The grain or seed dropping wheel 15 may be of any desired formation and is essentially a cast-metal wheel and is provided at its periphery with cups 22 of sufficient capacity to take up the requisite amount of grain and drop the same through the discharge-spout 20. The sides of the grain-wheel are parallel and straight, and the thickness of the grain-wheel is less than the distance between the sides of the box 18, and strips 27 are applied to the sides of the box and are disposed in vertical and coincident relation upon opposite sides of the grain-wheel, so as to prevent the grain from passing through the space on each side of the grain-wheel and escaping through the discharge-spout 20. The grain-wheel 15 operates in the rear portion of the box 18 wholly in the rear of the hopper 23, and its cups are accessible through the open end of the box for cleaning, inspecting, or removing obstructing matter. As the shaft 14 rotates, the grain-wheels attached thereto will revolve, and the cups will take up the requisite amount of seed and drop the same vertically into the spouts 20, and the seed will pass to the ground through the drills or seed-tubes 28.

The drills or seed-tubes 28 are attached to the rear ends of bars 29, which have pivotal connection at their front ends with the bar 1, and links 30 connect the rear ends of the tubes 28 with radius-arms 31, secured to a shaft 32, journaled in bearings applied to the rear bar 2. The radius-arms 31 have adjustable connection with the shaft 32, and their inner ends, which are apertured, are provided with binding-screws 33 to secure the arms in the adjusted position. A lever 34, secured to the shaft 32, is adapted to turn the latter to raise or lower the shoes or tubes 28 to drill the seed to a greater or less depth or to throw the tubes or drills out of the ground when the planter is not in service. This lever 34 is provided with the usual hand-latch 35, which coöperates with a notched segment 36, so as to hold the shaft 32 in the adjusted position.

A standard 37 rises from the frame and is provided at its upper end with a stub-shaft, upon which is mounted a sprocket-wheel 38, which supports the upper end of the sprocket-chain 13. A sprocket-wheel 39 is loosely mounted upon the shaft 14, and is provided on one side with a half-clutch, and a corresponding half-clutch 40 is slidably mounted upon the shaft 14, so as to revolve with the latter, and is adapted to be moved into and out of engagement with the half-clutch of the sprocket-wheel 39, so as to gear the latter with the shaft 14 or throw the same out of gear when it is not required to drop the seed. A shipper-lever 41 is fulcrumed intermediate of its ends to a bracket 42, secured to a side of the standard 37, and the front end of this shipper-lever is in engagement with the half-clutch 40, so as to move the latter upon the shaft 14. The rear end of the shipper-lever 41 is provided with a cam-slot 43, through which passes a radius-bar 44, having adjustable connection with the shaft 32 by means of a binding-screw 45, and this radius-bar 44 and cam-slot 43 are so proportioned and disposed that at a predetermined position of the shaft 32 the shipper-lever 41 will be actuated and throw the shaft 14 and the grain-wheels or seed-dropping mechanism out of gear, this result being attained when the shaft 32 is turned so as to throw the drills or shoes 28 out of engagement with the ground.

Having thus described the invention, what is claimed as new is—

1. In a planter, the combination of a comparatively narrow and oblong rectangular box having vertical sides parallel throughout their extent and a straight bottom provided at its rear end with a discharge-opening, a hopper at the front end of the box having its front wall closing the front end of the box and having its rear wall extending a short distance into the box, a slide having adjustable connection with the rear wall of the hopper, a transverse block applied to the bottom of the box in advance of the discharge-opening, a closed and parallel-sided grain-wheel operating in the rear portion of the box above the said block, cups corresponding in length to the width of the grain-wheel and placed around its periphery to take up a definite quantity of grain and drop the same vertically through the discharge-opening, the ends of the cups coming flush with the sides of the grain-wheel, and parallel strips secured vertically to the inner sides of the box with their lower ends touching the extremities of the block and with their inner faces or sides touching the sides of the grain-wheel, substantially as shown for the purpose set forth.

2. In a planter, the combination of a frame, a shaft 11 supporting the frame and having ground-wheels, a series of grain-boxes, a shaft 14 common to the boxes journaled therein and bearing grain-wheels to operate in the said boxes, a series of pivoted bars bearing drills or grain-shoes at their free ends, a standard secured to the frame, sprocket-gears applied to the standard and shaft 11, a sprocket-chain connecting the said sprocket-gears, a sprocket-gear 39 loosely mounted upon the shaft 14 and in mesh with the sprocket-chain, a clutch for throwing the sprocket-gear 39 into and out of engagement with the shaft 14, a shipper-lever in engagement with the sprocket-gear 39 at one end and having a cam-slot at its opposite end, a shaft 32 having arms 31 connected by links with the rear ends of the pivoted bars carrying the drills or grain-shoes to raise and lower the latter, a radius-bar secured at one end to the shaft 32 and having its other end operating through the cam-slot of the shipper-lever to move it positively in each direction, and a lever for operating the shaft 32 to simultaneously ship the sprocket-gear 39 and move the aforesaid pivoted bars, substantially as set forth for the purpose specified.

In testimony that I claim the foregoing as my own I have hereto affixed my signature in the presence of two witnesses.

WINFIELD S. SAVIERS.

Witnesses:
 A. LEVY,
 C. B. GREENWELL.